US011490725B2

(12) United States Patent
Moskovich et al.

(10) Patent No.: US 11,490,725 B2
(45) Date of Patent: Nov. 8, 2022

(54) PACKAGED PERSONAL CARE IMPLEMENT

(71) Applicant: Colgate-Palmolive Company, New York, NY (US)

(72) Inventors: Robert Moskovich, Manakin-Sabot, VA (US); Douglas Hohlbein, Hopewell, NJ (US)

(73) Assignee: Colgate-Palmolive Company, New York, NY (US)

( * ) Notice: Subject to any disclaimer, the term of this patent is extended or adjusted under 35 U.S.C. 154(b) by 744 days.

(21) Appl. No.: 16/464,794

(22) PCT Filed: Dec. 6, 2016

(86) PCT No.: PCT/US2016/065077
§ 371 (c)(1),
(2) Date: May 29, 2019

(87) PCT Pub. No.: WO2018/106216
PCT Pub. Date: Jun. 14, 2018

(65) Prior Publication Data
US 2019/0307240 A1    Oct. 10, 2019

(51) Int. Cl.
*A46B 17/04* (2006.01)
*A45D 44/18* (2006.01)
(Continued)

(52) U.S. Cl.
CPC .............. *A46B 17/04* (2013.01); *A45D 44/18* (2013.01); *A46B 9/04* (2013.01); *B65D 73/0092* (2013.01);
(Continued)

(58) Field of Classification Search
CPC .. B65D 75/32; B65D 75/366; B65D 73/0057; B65D 2575/36854; B65D 2581/00;
(Continued)

(56) References Cited

U.S. PATENT DOCUMENTS 4,039,079 A * 8/1977 Laughton ........... B65D 73/0014
206/820
4,915,231 A   4/1990 Perbet et al.
(Continued)

FOREIGN PATENT DOCUMENTS

| CN | 1561175 | 1/2005 |
|---|---|---|
| CN | 205240301 | 5/2016 |

(Continued)

OTHER PUBLICATIONS

International Search Report and Written Opinion of the International Searching Authority in International Application No. PCT/US2016/065077, dated Aug. 23, 2017.

*Primary Examiner* — Mollie Impink

(57) ABSTRACT

A package for an oral care implement. The package may have an exposed outer surface, a package portion forming a first portion of the exposed outer surface, and a reusable cap forming a second portion of the exposed outer surface. The package portion may define a first cavity and the reusable cap may define a second cavity. The package portion may be formed by a backer panel and a cover panel that are coupled together to define the first cavity. The reusable cap may have a flange that is sandwiched between the backer panel and the cover panel to secure the reusable cap to the package portion. A personal care implement may be disposed within the package so that a first portion of personal care implement is located within the first cavity and a second portion of the personal care implement is located within the second cavity.

12 Claims, 9 Drawing Sheets

(51) Int. Cl.
*A46B 9/04* (2006.01)
*B65D 75/36* (2006.01)
*B65D 81/36* (2006.01)
*B65D 75/00* (2006.01)
*B65D 73/00* (2006.01)

(52) U.S. Cl.
CPC ............ *B65D 75/00* (2013.01); *B65D 75/366* (2013.01); *B65D 81/36* (2013.01); *A46B 2200/1066* (2013.01); *A61C 2202/00* (2013.01)

(58) Field of Classification Search
CPC ..... B65D 81/36; A46B 17/04; A46B 11/0089; A45D 44/18
USPC .................................. 206/209, 362.2, 362.3
See application file for complete search history.

(56) References Cited

U.S. PATENT DOCUMENTS

| | | | |
|---|---|---|---|
| 5,154,293 A | | 10/1992 | Gould |
| D401,765 S | * | 12/1998 | Soutullo ................ D9/415 |
| 6,308,832 B1 | * | 10/2001 | Pirro ................ B65D 75/24 |
| | | | 206/469 |
| 6,526,991 B2 | | 3/2003 | Bodwalk |
| 6,945,397 B2 | | 9/2005 | Brattesani et al. |
| 6,954,961 B2 | | 10/2005 | Ferber et al. |
| 7,094,981 B2 | | 8/2006 | Sorrentino et al. |
| 7,617,828 B1 | | 11/2009 | Sinha |
| 9,155,601 B2 | | 10/2015 | Le et al. |
| 9,409,689 B2 | | 8/2016 | Nguyen |
| 9,434,522 B2 | | 9/2016 | Leiner et al. |
| 9,505,540 B2 | | 11/2016 | Nguyen |
| 9,718,594 B2 | | 8/2017 | Jungnickel et al. |
| 9,980,798 B2 | | 5/2018 | Moskovich et al. |
| 2001/0032796 A1 | | 10/2001 | Rubenstein |
| 2001/0052478 A1 | | 12/2001 | Casanova et al. |
| 2005/0109662 A1 | | 5/2005 | Kirk |
| 2007/0080081 A1 | | 4/2007 | Chang |
| 2009/0123217 A1 | * | 5/2009 | Ross ................... A46B 11/0041 |
| | | | 401/269 |
| 2010/0306940 A1 | | 12/2010 | Park |
| 2013/0256165 A1 | | 10/2013 | Moskovich |
| 2014/0339111 A1 | * | 11/2014 | Moskovich ............ A61C 19/02 |
| | | | 206/362.3 |
| 2015/0164199 A1 | | 6/2015 | Marcinkowski |
| 2018/0296297 A1 | * | 10/2018 | Moloney ............. B65D 75/366 |

FOREIGN PATENT DOCUMENTS

| | | | | |
|---|---|---|---|---|
| KR | 20150066872 A1 | * | 12/2015 | ............. A46B 17/04 |
| WO | 2000/023349 | | 4/2000 | |
| WO | WO-0024289 A1 | * | 5/2000 | ............. A46B 17/04 |

* cited by examiner

PACKAGED PERSONAL CARE IMPLEMENT

BACKGROUND

One common type of display packaging for an oral care implement, such as a toothbrush, comprises blister packaging that includes a rigid, transparent front cover made of a clear plastic film that permits visual inspection of the oral care implement. The quality and functional characteristics of oral care implements can vary greatly. Providing consumers with all of the information needed to make optimal purchasing decisions at the point of sale can be challenging due to the relatively small size of the packages and the need to keep the oral care implement enclosed in the package. Furthermore, when traveling people either need to bring a toothbrush with them or purchase a new toothbrush at their destination. Often people don't have an adequate cover for the bristles to keep the toothbrush sanitized during travel. There is a need for improved display packaging to help consumers make more informed purchasing decisions and to ensure that consumers have an adequate mechanism for maintaining sanitization of the toothbrush during travel.

BRIEF SUMMARY

The present invention is directed to a package for an oral care implement and a packaged oral care implement. In one embodiment, the package may have an exposed outer surface, a package portion forming a first portion of the exposed outer surface, and a reusable cap forming a second portion of the exposed outer surface. The package portion may define a first cavity and the reusable cap may define a second cavity. The package portion may be formed by a backer panel and a cover panel that are coupled together to define the first cavity. The reusable cap may have a flange that is sandwiched between the backer panel and the cover panel to secure the reusable cap to the package portion. A personal care implement may be disposed within the package so that a first portion of personal care implement is located within the first cavity and a second portion of the personal care implement is located within the second cavity. The personal care implement may be a toothbrush.

In one aspect, the invention may be a packaged personal care implement comprising: a package comprising: an exposed outer surface; a package portion having an inner surface defining a first cavity having a first opening, the package portion having an outer surface that defines a first portion of the exposed outer surface; and a reusable cap comprising an outer surface that forms a second portion of the exposed outer surface and an inner surface that defines a second cavity having a second opening; and a personal care implement disposed within the package so that the personal care implement extends through the first and second openings such that a first portion of the personal care implement is located within the first cavity and a second portion of the personal care implement is located within the second cavity.

In another aspect, the invention may be a packaged oral care implement comprising: a package comprising: a backer panel having a front surface, a rear surface, and an opening extending therethrough; a cap at least partially disposed within the opening, the cap having a first portion and a second portion that are coupled together by a hinge and alterable between an open state and a closed state, the cap defining a cavity in the closed state; and a cover panel having a front surface, a rear surface, and a receiving cavity, the cover panel coupled to the backer panel with the hinge of the cap sandwiched between the rear surface of the cover panel and the front surface of the backer panel; and an oral care implement comprising a handle and a head positioned in the package, wherein the handle is located within the receiving cavity of the cover panel and the head is located within the cavity of the cap.

In yet another aspect, the invention may be a packaged oral care implement comprising: a package comprising: a backer panel having a front surface; a cap comprising an outer surface having a flange extending therefrom and an inner surface that defines a cavity; and a cover panel having a rear surface, the cover panel coupled to the backer panel so that the flange of the cap is sandwiched between the rear surface of the cover panel and the front surface of the backer panel; and an oral care implement comprising a handle and a head positioned in the package, wherein the handle rests atop the front surface of the backer panel and the head is located within the cavity of the cap.

In still another aspect, the invention may be a packaged oral care implement comprising: a package comprising: a backer panel having a front surface; a reusable cap comprising an outer surface that forms a portion of an exposed exterior of the package and an inner surface that defines a cavity; and a cover panel coupled to the backer panel; and an oral care implement comprising a handle and a head, wherein the head is located within the cavity of the cap.

In a further aspect, the invention may be a package comprising: a backer panel having a front surface, a rear surface, and an opening; a cap extending through the opening and comprising an outer surface having a flange extending from opposing sides thereof and an inner surface that defines a cavity; and a cover panel comprising a rear surface and a receiving cavity having an open rear end, the cover panel coupled to the backer panel so that the flange of the cap is sandwiched between the rear surface of the cover panel and the front surface of the backer panel and the backer panel closes the open rear end of the receiving cavity.

In a still further aspect, the invention may be a package comprising: a package portion comprising an outer surface that defines a first exposed portion of an outer surface of the package and an inner surface that defines a first cavity; and a reusable cap comprising an outer surface that forms a second exposed portion of the outer surface of the package and an inner surface, wherein the reusable cap is repeatedly alterable between an open state and a closed state, and wherein in the closed state the inner surface of the reusable cap defines a second cavity.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
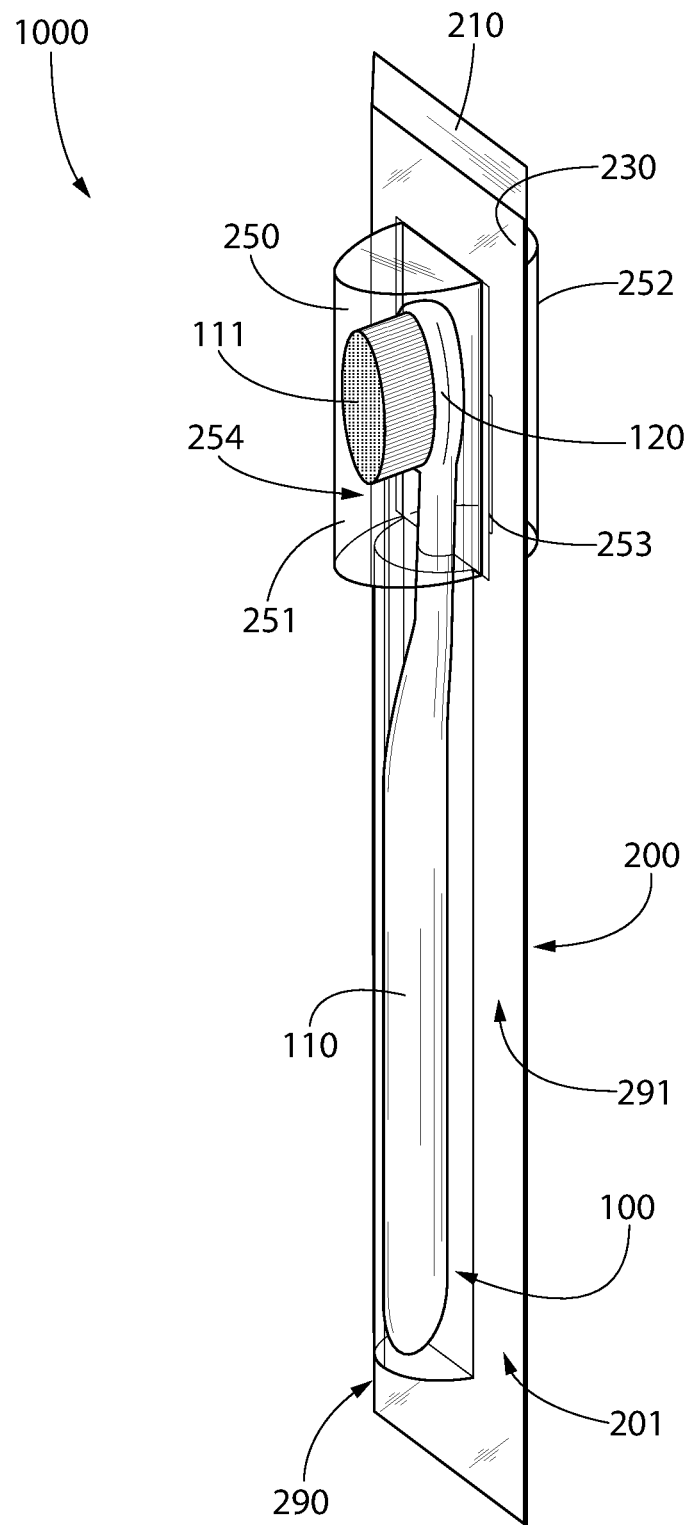
FIG. 1 is front perspective view of a packaged oral care implement in accordance with an embodiment of the present invention.
Figure 2:
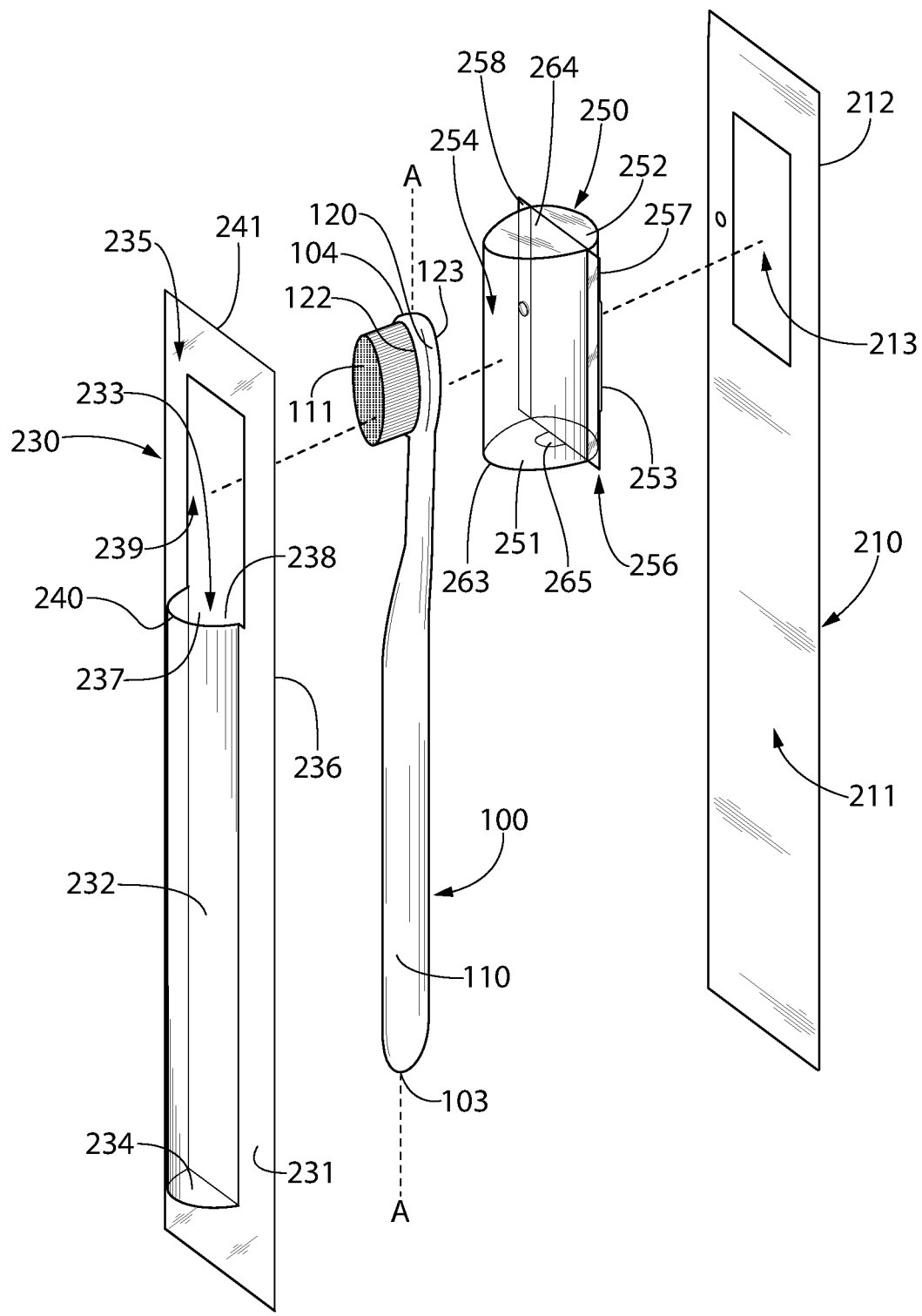
FIG. 2 is an exploded view of the packaged oral care implement of FIG. 1.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

Referring to FIG. 1-5 concurrently, a packaged personal care implement 1000 is illustrated in accordance with an embodiment of the present invention. The packaged personal care implement 1000 generally comprises a personal care implement 100 and a package 200 that retains and encloses the personal care implement 100. In the exemplified embodiment, the personal care implement 100 is an oral care implement or toothbrush, although other possible devices may be used within the scope of this invention as discussed below.

Typically, the personal care implement 100 is disposed within the package 200 during transport from a manufacturing facility and during display at a retail store. After a consumer purchases the personal care implement 100, the user will remove the personal care implement 100 from the package 200 so that the user can utilize the personal care implement 100 as intended (e.g., to brush his/her teeth when the personal care implement 100 is a toothbrush). With conventional packages, a user would then throw away the package and keep the personal care implement 100 in a holder located near a bathroom sink, within a medicine cabinet, within a cabinet drawer, or the like. In the invention described herein, a portion of the package 200 is reusable as a travel cap or other protective covering for a portion of the personal care implement 100. Although the invention is illustrated in the drawings with a personal care implement 100 located within the package 200, the invention in some embodiments may be directed to the package 200 by itself without a personal care implement or other product retained therein.

In the exemplified embodiment, the personal care implement 100 that is retained within the package 200 is in the form of a manual toothbrush. However, in certain other embodiments the personal care implement 100 can take on other forms such as being a powered toothbrush, a tongue scraper, a gum and soft tissue cleanser, a water pick, an interdental device, a tooth polisher, a specially designed ansate implement having cleaning elements, or any other type of implement that is commonly used for oral care. In embodiments that use a powered toothbrush, the toothbrush could have bristles that are vibrated by a motor and eccentric or bristles that are on a plate that rotates/oscillates. In some embodiments the personal care implement 100 may not be one that is specifically used for oral care, such as a deodorant application implement, a face or body cleaning implement, a razor or shaving implement, a hairbrush, or the like. As will be better understood from the description below, in some embodiments the invention is directed to a package for any type of implement that might benefit from having a reusable cap that can be used for general storage and more particularly for storage and protection during travel.

In the exemplified embodiment, the personal care implement 100 comprises a first portion or handle 110 and a second portion or head 120. The personal care implement 100 extends from a proximal end 103 to a distal end 104 along a longitudinal axis A-A. In the exemplified embodiment the handle 110 and the head 120 form an integral structure that is a single, unitary component. However, in other embodiments the handle 110 and the head 120 may be separate components. For example, the head 120 may be a refill or replaceable head that is detachably coupled to the handle 120.

The handle 110 is an elongated structure that provides the mechanism by which the user can hold and manipulate the personal care implement 100 during use. In the exemplified embodiment, the handle 110 is generically depicted having various contours for user comfort. Of course, the invention is not to be limited by the specific shape illustrated for the handle 110 in all embodiments and in certain other embodiments the handle 110 can take on a wide variety of shapes, contours, and configurations, none of which are limiting of the present invention unless so specified in the claims.

The handle 110 may be formed of a hard or rigid plastic material, such as for example without limitation polymers and copolymers of ethylene, propylene, butadiene, vinyl compounds, and polyesters such as polyethylene terephthalate. The handle 110 may also include a grip that is formed of a resilient/elastomeric material, such as a thermoplastic elastomer. Such a grip may be molded over a portion of the handle 110 that is typically gripped by a user's thumb and forefinger during use. Furthermore, it should be appreciated that additional regions of the handle 110 can be overmolded with the resilient/elastomeric material to enhance the gripability of the handle 110 during use. For example, portions of the handle 110 that are typically gripped by a user's palm during use may be overmolded with a thermoplastic elastomer or other resilient material to further increase comfort to a user. Furthermore, materials other than those noted above can be used to form the handle 110, including metal, wood, or any other desired material that has sufficient structural rigidity to permit a user to grip the handle 110 and manipulate the personal care implement 100 during oral care activities such as toothbrushing or personal care activities such as facial cleansing.

The head 120 of the personal care implement 100 is coupled to the handle 110 and comprises a front surface 122 and an opposing rear surface 123. In the exemplified embodiment, the head 120 is formed integrally with the handle 110 as a single unitary structure using a molding (i.e., injection molding), milling, machining, or other suitable process. However, in other embodiments the handle 110 and the head 120 may be formed as separate components which are operably connected at a later stage of the manufacturing process by any suitable technique known in the art, including without limitation thermal or ultrasonic welding, a tight-fit assembly, a coupling sleeve, threaded engagement, adhesion, or fasteners. Thus, the head 120 may, in certain embodiments, be formed of any of the rigid plastic materials described above as being used for forming the handle 110, although the invention is not to be so limited in all embodiments and other materials that are commonly used during toothbrush head manufacture may also be used.

In the exemplified embodiment, the personal care implement 100 is a toothbrush and it includes a plurality of tooth cleaning elements 111 that are coupled to and extend from the head 120. More specifically, in the exemplified embodiment the tooth cleaning elements 111 extend from the front surface 122 of the head 120. The tooth cleaning elements 111 are generically depicted in the drawings as comprising a plurality of bristles, but may include various different types of elements that are used to clean teeth and other oral surfaces as described herein below. A tongue or soft tissue cleaner (not depicted) may be positioned on the rear surface 123 of the head 120. Such a tongue or soft tissue cleaner may be formed of an elastomeric material and may include protrusions, nubs, ridges, scrapers, or the like for engaging and cleaning a user's oral tissue surfaces.

The term "tooth cleaning elements" is used in a generic sense to refer to any structure that can be used to clean, polish, or wipe the teeth and/or soft oral tissue (e.g. tongue, cheek, gums, etc.) through relative surface contact. Common examples of "tooth cleaning elements" include, without limitation, bristle tufts, filament bristles, fiber bristles, nylon bristles, spiral bristles, rubber bristles, elastomeric protrusions, flexible polymer protrusions, combinations thereof and/or structures containing such materials or combinations. The tooth cleaning elements may include tapered bristles, non-tapered (i.e., end rounded) bristles, and combinations thereof. Any combination of the various types of tooth cleaning elements may be used on the personal care implement 100 in different embodiments. Thus, although the exemplified embodiment illustrates all of the tooth cleaning elements 111 as bristle filaments, the invention is not to be so limited in all embodiments and bristle filaments alone, a combination of bristle filaments and rubber bristles, rubber bristles alone, or other combinations of the different tooth cleaning element types identified above may be used.

In embodiments that use elastomeric/rubber elements as one or more of the tooth cleaning elements 111, suitable elastomeric materials may include any biocompatible resilient material suitable for uses in an oral hygiene apparatus. To provide optimum comfort as well as cleaning benefits, the elastomeric material of any such tooth or soft tissue engaging elements may have a hardness property in the range of A8 to A25 Shore hardness. One suitable elastomeric material is styrene-ethylene/butylene-styrene block copolymer (SEBS) manufactured by GLS Corporation. Nevertheless, SEBS material from other manufacturers or other materials within and outside the noted hardness range could be used. The tooth cleaning elements 111 may be coupled to the head 120 using any technique known in the art, such as stapling, anchor-free tufting (AFT), in-mold tufting, AMR, or the like. The invention is not to be limited by the manner in which the tooth cleaning elements 111 are coupled to the head 120 unless specifically recited as such in the claims.

Although an exemplary personal care implement 100 is illustrated in the figures and has been described above, the invention is not to be particularly limited by the details of the personal care implement 100 in all embodiments. Many variations to the structure and type of the personal care implement 100 are possible within the scope of the present invention. The pertinent features of the present invention relate to the details of the package 200, which will now be described.

The package 200 has an exposed outer surface 201 and generally comprises a package portion 290 and a cap 250. The package portion 290 has an outer surface 291 that forms a first portion of the exposed outer surface 201 of the package. The cap 250 has an outer surface 254 that forms a second portion of the exposed outer surface 201 of the package. As described in greater detail below, in the exemplified embodiment the cap 250 is a reusable cap. The reusable cap forms an exposed portion of the package 200 rather than being stored completely within the package 200.

In the exemplified embodiment the package portion 290 comprises a backer panel 210 and a cover panel 230. However the invention is not to be so limited in all embodiments and in other embodiments the package portion 290 may comprise a blister carton without also including a backer panel. Specifically, in the exemplified embodiment, as discussed below, the backer panel 210 and the cover panel 230 collectively form a cavity that holds a portion of the personal care implement 100. However, in other embodiments the package portion 290 may be a unitary blister component that forms the cavity that holds the portion of the personal care implement 100.

Referring again to the exemplified embodiment, the backer panel 210, the cover panel 230, and the cap 250 are separate and distinct components of the package 200 that cooperate with one another and/or are coupled to one another to form the package 200. The backer panel 210, the cover panel 230, and the cap 250 further cooperate to either partially or fully enclose the personal care implement 100 within the package 200. Specifically, the backer panel 210, the cover panel 230, and the cap 250 at least enclose the head 120 and tooth cleaning elements 111 of the personal care implement 100 to protect them against damage and germs/bacterial during transport to the retail site and at the point of sale before purchase. It may also be desirable to fully enclose the handle 110 of the personal care implement 100 to protect it prior to purchase, although this is not required in all embodiments.

In the exemplified embodiment, the backer panel 210 is a flat panel having a front surface 211 and a rear surface 212. Thus, in the exemplified embodiment both the front and rear surfaces 211, 212 of the backer panel 210 are flat, planar surfaces. Of course, the invention is not to be so limited in all embodiments and in certain other embodiments one or both of the front and rear surfaces 211, 212 of the backer panel 210 may be contoured, have three-dimensional regions, or the like. In the exemplified embodiment the backer panel 210 also includes an opening 213 extending entirely through the backer panel 210 from the front surface 211 to the rear surface 212. In some embodiments, the opening 213 is sized and shaped so that at least the entirety of the length of the head 120 of the personal care implement 100 (measured in the direction of the longitudinal axis A-A) is located within or aligned with the opening 213. The opening 213 is illustrated as being rectangular in shape, but the invention is not to be so limited in all embodiments and it could be circular or any polygonal shape as desired. Furthermore, in some embodiments the backer panel 210 may end at the upper-most end of the opening 213 such that the upper-most end of the opening 213 forms a portion of an upper-most edge of the backer panel 210 (by removing the portion of the backer panel 210 that extends from the upper-most end of the opening 213 to the upper-most edge of the backer panel 210 or extending the opening 213 up to the upper-most edge of the backer panel 210).

In certain embodiments, the backer panel 210 may be formed from an opaque cellulosic material, such as a cardboard, paperboard, paper stock, or the like. Of course, the invention is not to be so limited and the backer panel 210 may be formed of transparent or translucent materials, and the backer panel 210 may be formed of materials other than cellulosic material, such as plastics or the like, in other embodiments. In certain embodiments, at least one of the front and rear surfaces 211, 212 of the backer panel 210 may include text, indicia, patterned coloring, instructions, graphics, or the like. The backer panel 210 may also include an aperture in a top thereof (distinct from the opening 213) for hanging the package 200 from a hook in a retail establishment.

In the exemplified embodiment, the cover panel 230 is coupled directly to the backer panel 210 and collectively the cover panel 230 and the backer panel 210 form an enclosed cavity that receives a portion of the personal care implement 100. Of course, as discussed above in other embodiments the cover panel 230 may by itself form an enclosed cavity and the backer panel 210 may be omitted.

In the exemplified embodiment, the cover panel 230 is formed of a transparent plastic material. Forming the cover panel 230 out of a transparent material is desirable in some embodiments so that the personal care implement 100 contained therein is visible to a consumer for inspection prior to purchase. The cover panel 230 enables a consumer to view and inspect the personal care implement 100 contained within the package 200 while preventing a consumer from directly touching/contacting the personal care implement 100 prior to purchase or prior to opening the package 200 by separating the cover panel 230 from the backer panel 210 or otherwise. As used herein, the term transparent is not limited to materials that allow 100% of light to pass therethrough, but rather also includes translucent materials, materials that are tinted with a color while allowing some (or all) of the light to pass therethrough, or the like. Furthermore, in some embodiments only part of the cover panel 230 may be transparent while other parts of the cover panel 230 may not be transparent (i.e., opaque or the like). However, the use of a transparent material is preferable in certain embodiments so that a consumer can view the personal care implement 100 positioned within the package 200 prior to purchase.

In certain particular embodiments, the cover panel 230 may be made from a formable web, such as a thermoformed plastic. Suitable thermoformed plastics may include materials such as polyethylene terephthalate (PET, PETA PETG, PETGAG), polyvinyl chloride (PVC), polypropylene (PP), or styrol-butadiene-block copolymer (SBS), preferred PCV. Other suitable materials for the thermoformed plastic film include, without limitation, renewable primary products, for example of cornstarch, sugar (polyhydroxybutyrate/-valerate), cellulose diacetate, cellulose nitrate, and polylactide (PLA).

The cover panel 230 comprises a front surface 235 and an opposite rear surface 236. Furthermore, the cover panel 230 comprises a perimeter portion 231 and a three-dimensionally contoured portion 232 that defines a receiving cavity 233 within which the handle 110 of the personal care implement 100 is positioned when the personal care implement 100 is stored within the package 200. Furthermore, the cover panel 230 comprises a bottom wall 234 that connects the three-dimensionally contoured portion 232 to the perimeter portion 231 near a distal end of the cover panel 230. In the exemplified embodiment the perimeter portion 231 is planar at the front and rear surfaces of the cover panel 230 to facilitate a good connection between the perimeter portion 231 of the cover panel 230 and the backer panel 210 as discussed in more detail below. However, the perimeter portion 231 need not be entirely planar in all embodiments and variations are possible while still ensuring that the cover panel 230 can be securely coupled to the backer panel 210 as would be understood by persons skilled in the art.

In the exemplified embodiment, the three-dimensionally contoured portion 232 of the cover panel 230 is a single dome-shaped portion having a semi-circular cross-sectional shape, but in other embodiments it may be formed by multiple sidewalls having a semi-polygonal (i.e., square, rectangular, etc.) cross-sectional shape or the like. The receiving cavity 233 of the cover panel 230 comprises a closed front end formed by the three-dimensionally contoured portion 232 and a closed bottom end formed by the bottom wall 234. Furthermore, the receiving cavity 233 comprises an open rear end 237 and an open top end 238. The open top end 238 may be referred to herein as an opening of the receiving cavity 233. The open rear end 237 permits the handle 110 of the personal care implement 100 to be received within the receiving cavity 233 and the open top end 238 permits a neck portion of the personal care implement 100 to extend through/out of the open top end 238 of the receiving cavity 233.

In the exemplified embodiment, the cover panel 230 comprises an opening 239 extending through the cover panel 230 from the front surface 235 to the rear surface 236. The opening 239 in the cover panel 230 is located between an uppermost end 240 of the three-dimensionally contoured portion 232 and a portion of the perimeter portion 231 that is adjacent to a top end 241 of the cover panel 230. However, in other embodiments the cover panel 230 may terminate at the top end 238 of the receiving cavity 233 (i.e., at the upper-most end 240 of the three-dimensionally contoured portion 232). In such an embodiment, the opening 239 will not be present.

In the assembled package 200, the cover panel 230 is coupled to the backer panel 210 with the rear surface 236 of the cover panel 230 adjacent to and in contact with the front surface 211 of the backer panel 210. More specifically, the rear surface 236 of the cover panel 230 along the perimeter portion 231 of the cover panel 230 is coupled directly to the front surface 211 of the backer panel 210. The perimeter portion 231 of the cover panel 230 can be sealed or otherwise coupled to the front surface 211 of the backer panel 210 by heat sealing techniques, pressure-sensitive adhesive (or any type of adhesive), mechanical fasteners such as staples, by wrapping portions of the side edges of the cover panel 230 around the backer panel, and/or by other suitable techniques. When the cover panel 230 is coupled to the backer panel 210, the backer panel 210 closes the open rear end 237 of the receiving cavity 233 thereby creating a mostly enclosed space (mostly enclosed because the top end 238 remains open) for holding the handle 110 of the personal care implement 100. In the exemplified embodiment, the handle 110 of the personal care implement 100 is circumferentially surrounded collectively by the cover panel 230 (and more specifically the three-dimensionally contoured portion 232 of the cover panel 230) and the backer panel 210. Furthermore, the opening 239 of the cover panel 230 is aligned with the opening 213 of the backer panel 210. The head 110 and tooth cleaning elements 111 (where applicable) of the personal care implement 100 are either aligned with or permitted to pass through the opening 239 as described in more detail below.

In conventional oral care implement packages, the cover panel has a three-dimensional contour that forms a cavity within which the entirety of the oral care implement nests. In the invention described herein, the cover panel 230 has a receiving cavity 233 that only the handle 110 of the personal care implement 100 nests within. The neck of the personal care implement 100 extends through the open top end 238 of the receiving cavity 233 so that no portion of the head 120 is located within the receiving cavity 233. Thus, the head 120 of the personal care implement 100 is located external to the receiving cavity 233 of the cover panel 230. However, as discussed in more detail below, the head 120 of the personal care implement 100 is retained within the cap 250, thereby providing adequate protection to the head 120 and tooth cleaning elements 111 of the personal care implement 100.

As discussed above, the package 200 also includes the cap 250. In the exemplified embodiment, the cap 250 generally comprises a first portion 251 and a second portion 252 that are coupled together by a hinge 253. Thus, in the exemplified embodiment the first and second portions 251, 252 can be rotated relative to one another about the hinge 253 between an open state and a closed state, as discussed in more detail below. In the exemplified embodiment, the hinge 253 is a living hinge such that the first portion 251, the second portion 252, and the hinge 253 are integrally formed from the same material. Thus, the hinge 253 is a thin flexible hinge made from the same material as the two pieces (i.e., the first and second portions 251, 252 of the cap 250) that it connects. Of course, in other embodiments the first and second portions 251, 252 of the cap 250 may be separate members that are not coupled together via a hinge, but rather that can be mechanically coupled together. In such embodiment, in the closed state the first and second portions 251, 252 of the cap 250 may be coupled together and in the open state the first and second portions 251, 252 of the cap 250 may be completely separated from one another. In still other embodiments, the cap 250 may not be alterable between open and closed states but rather may include an opening through which the head 120 of the personal care implement 100 may pass through when positioning the head 120 of the personal care implement 100 within the cap 250.

The cap 250 has an outer surface 254 and an inner surface 255. The outer surface 254 extends along a longitudinal axis B-B between a bottom surface 263 of the cap 250 and a top surface 264 of the cap 250. The top surface 264 of the cap 250 is fully enclosed and the bottom surface 263 of the cap 250 has an opening 265 therein. The opening 265 permits the neck of the personal care implement 100 to extend through the cap 250 while the head 120 of the personal care implement 100 is located within the cap 250 so that the cap 250 can close around the head 120 of the personal care implement 100. Thus, the cap 250, by itself, fully and circumferentially surrounds and encloses the head 120 of the personal care implement 100.

Furthermore, in the exemplified embodiment the cap 250 comprises a flange 256 extending from the outer surface 254. The flange 256 has a first portion 257 extending from a first side of the outer surface 254 and a second portion 258 extending from a second side of the outer surface 254. In the exemplified embodiment, each of the first and second portions 257, 258 of the flange 256 extends the entire length between the top and bottom surfaces 263, 264 of the cap 250. However, this is not required in all embodiments and the first and second portions 257, 258 of the flange 256 may have a shorter length in other embodiments.

Each of the first and second portions 257, 258 of the flange 156 is formed partially by the first portion 251 of the cap 250 and partially by the second portion 252 of the cap 250. In the exemplified embodiment, the first and second portions 257, 258 of the flange 256 are circumferentially spaced apart from one another. More specifically, the first and second portions 257, 258 of the flange 256 are spaced apart from one another by approximately 180° about the outer surface 254. In the exemplified embodiment, there is no flange extending from the top and bottom surfaces 263, 264 of the cap 250. However, in other embodiments the flange 256 may have additional portions extending from the top and/or bottom surfaces 263, 264 of the cap 250 (or there may be a flange on one or both of the top and/or bottom surfaces 263, 264 of the cap 250 only without also being located on the sides thereof.

In the exemplified embodiment, the first portion 257 of the flange 256 forms or comprises the hinge 253 of the cap 250. The second portion 257 of the flange 256 forms or comprises a clasp mechanism 259 that permits the cap 250 to be secured in the closed state as discussed in more detail below. In addition to forming the functional elements of the hinge 253 and the clasp mechanism 259, the flange 256 also facilitates in coupling the cap 250 to the backer panel 210 and the cover panel 230 as described in more detail below with specific reference to FIG. 4. As will be better understood from the description below, extending the flange 256 to the top and bottom surfaces 263, 264 of the cap 250 will assist in more securely coupling the cap 250 to the backer panel 210 and the cover panel 230 (i.e., to the package portion 290).

Figure 6A:
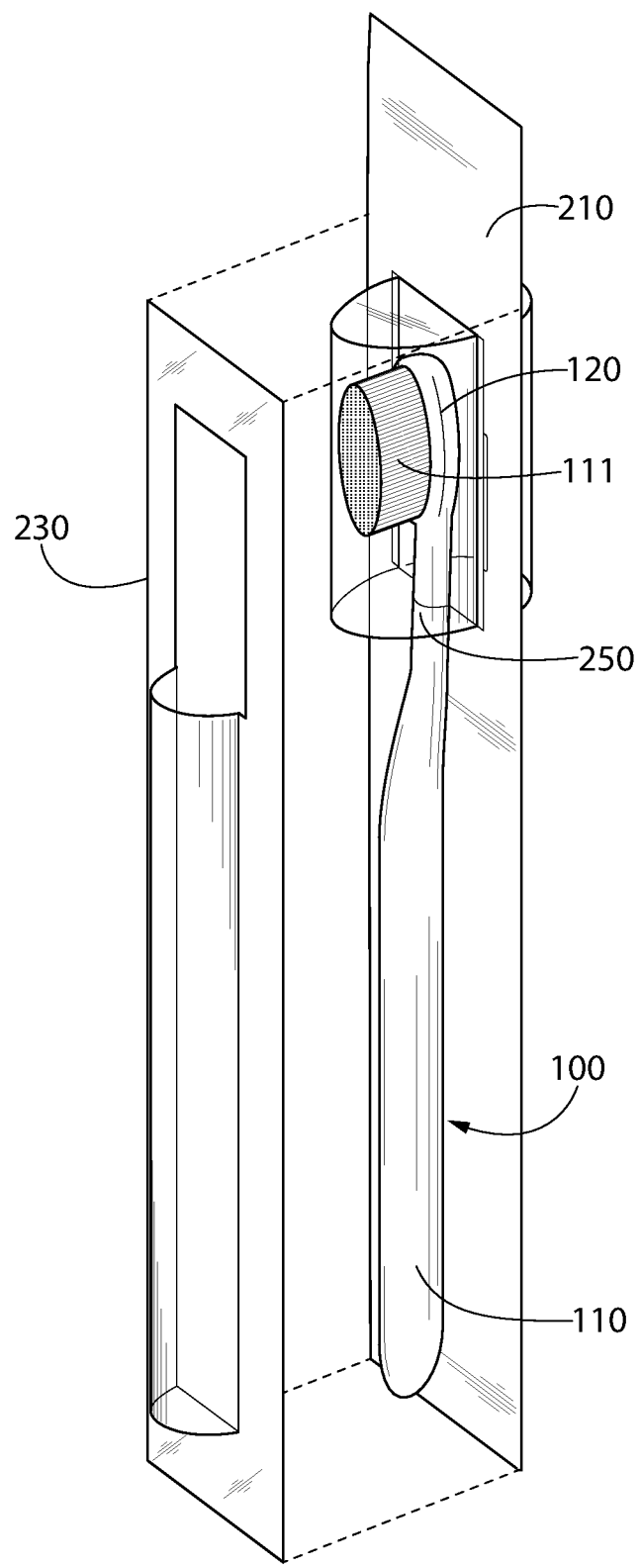
FIG. 6A is a front perspective view of the packaged oral care implement of FIG. 1 with a cover panel thereof separated from a backer panel thereof and with a cap thereof coupled to the backer panel and a portion of the oral care implement being located within a cavity of the cap.
Figure 6B:
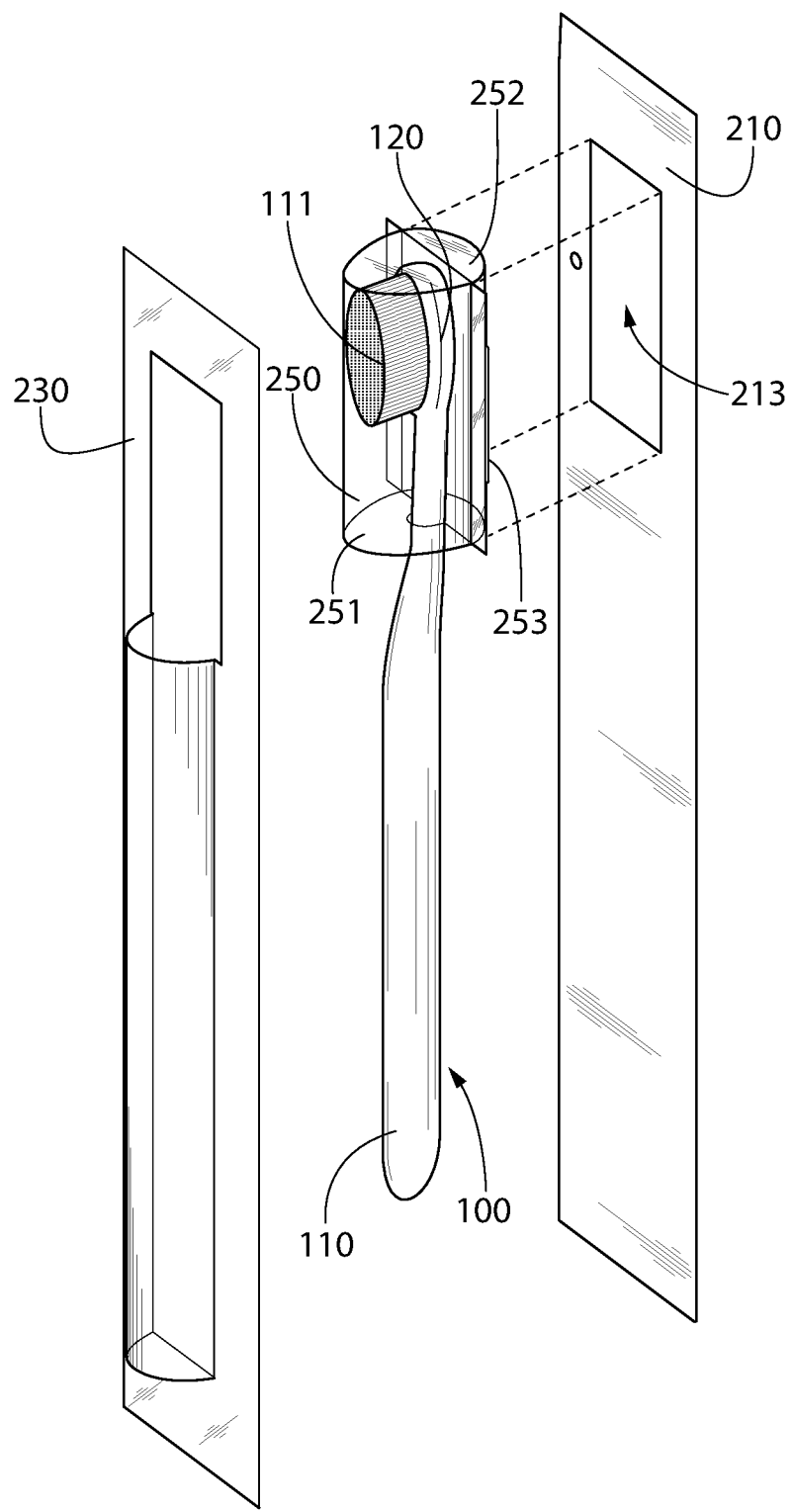
FIG. 6B is a front perspective view of the packaged oral care implement of FIG. 6A with the oral care implement and the cap separated from the cover panel and the backer panel with the portion of the oral care implement remaining located within the cavity of the cap.
Figure 6C:
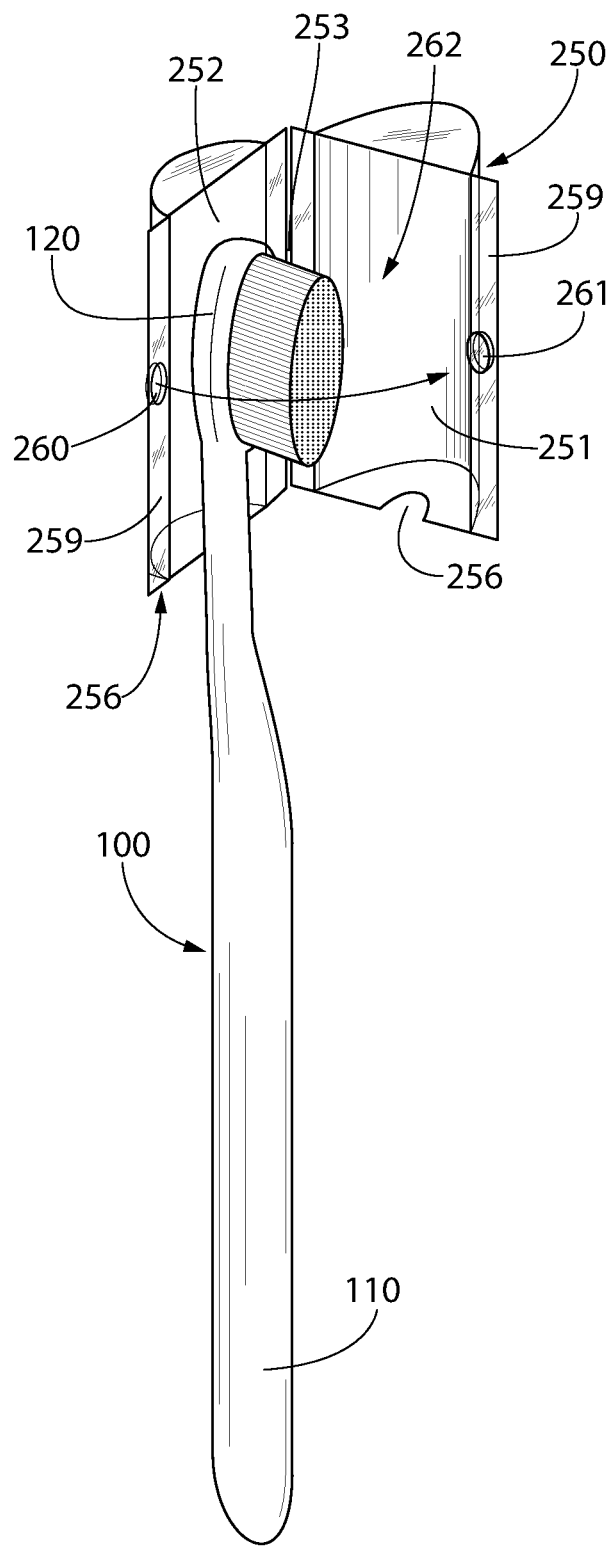
FIG. 6C is a front perspective view of the oral care implement and the cap with the cap in an open state.

As noted above, the hinge 253 permits the cap 250 to be altered between the closed state (illustrated in FIGS. 2 and 4) and the open state (illustrated in FIG. 6C). Specifically, the first and second portions 251, 252 can be rotated relative to one another about the hinge 253 between the closed state and the open state. At the second portion 258 of the flange 256, the first portion 251 of the cap 250 comprises a first coupling mechanism 260 and the second portion 252 of the cap 250 comprises a second coupling mechanism 261 that mates with the first coupling mechanism 260 to secure the cap 250 in the closed state (the first and second coupling mechanisms 260, 261 collectively form the clasp mechanism 259).

In the exemplified embodiment, the first coupling mechanism 260 is a recess and the second coupling mechanism 261 is a protuberance that can be inserted into and temporarily secured within the recess of the first coupling mechanism 260 to secure the cap 250 in the closed state. The protuberance can be repeatedly inserted into the recess and removed from the recess to open/close the cap 250. Of course, features other than a protuberance and a recess can be used so long as the first and second coupling mechanisms 260, 261 cooperate or mechanically mate with one another to secure the cap 250 in the closed state. Alternatively, the first and second coupling mechanisms 260, 261 may be replaced with a latch mechanism. Thus, any mechanism that facilitates securing the cap 250 in the closed state may be used in alternative embodiments. When the cap 250 is in the closed state, a user can force the cap 250 from the closed state into the open state by pulling the portions of the second portion 258 of the flange 256 formed by the first and second portions 251, 252 of the cap 250 in opposite directions.

Figure 3:
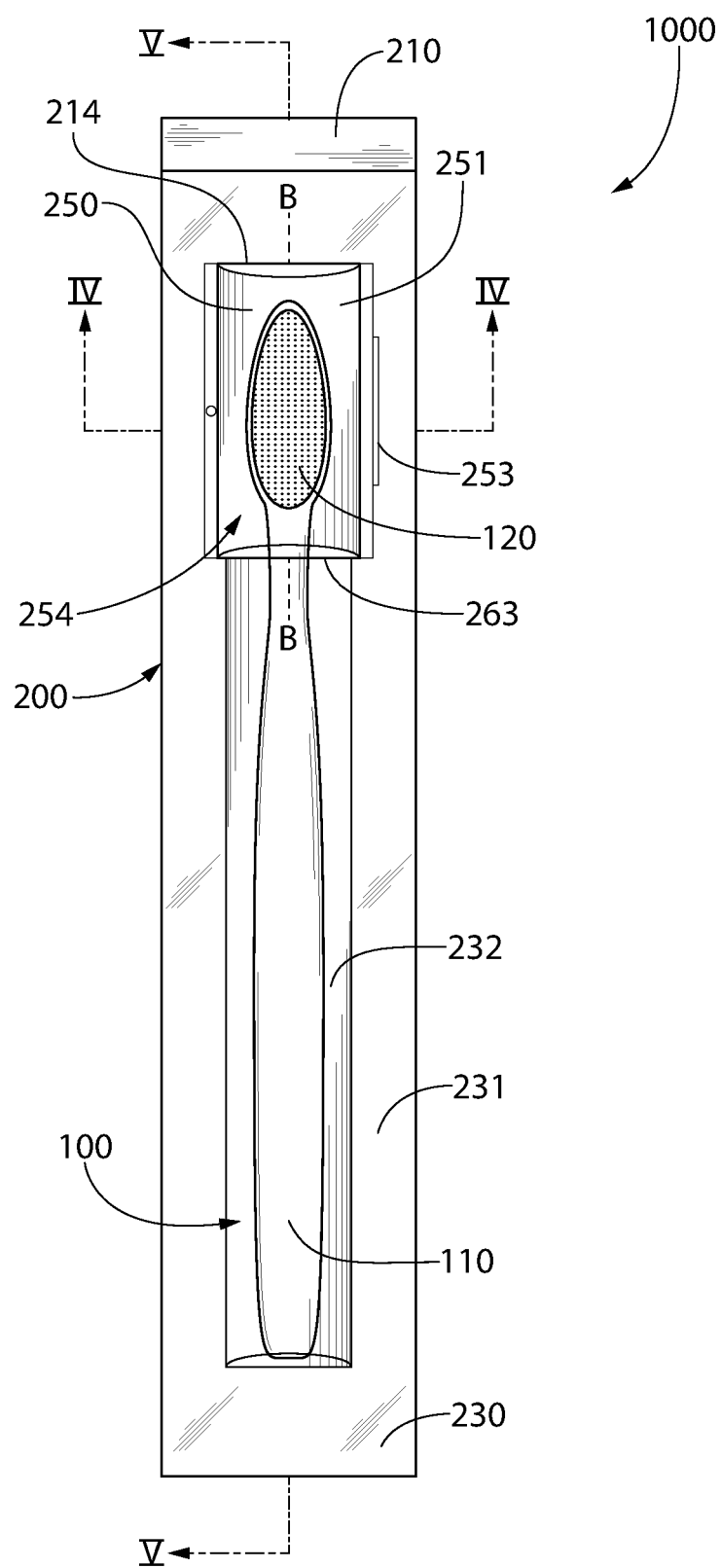
FIG. 3 is a front view of the packaged oral care implement of FIG. 1.
Figure 4:
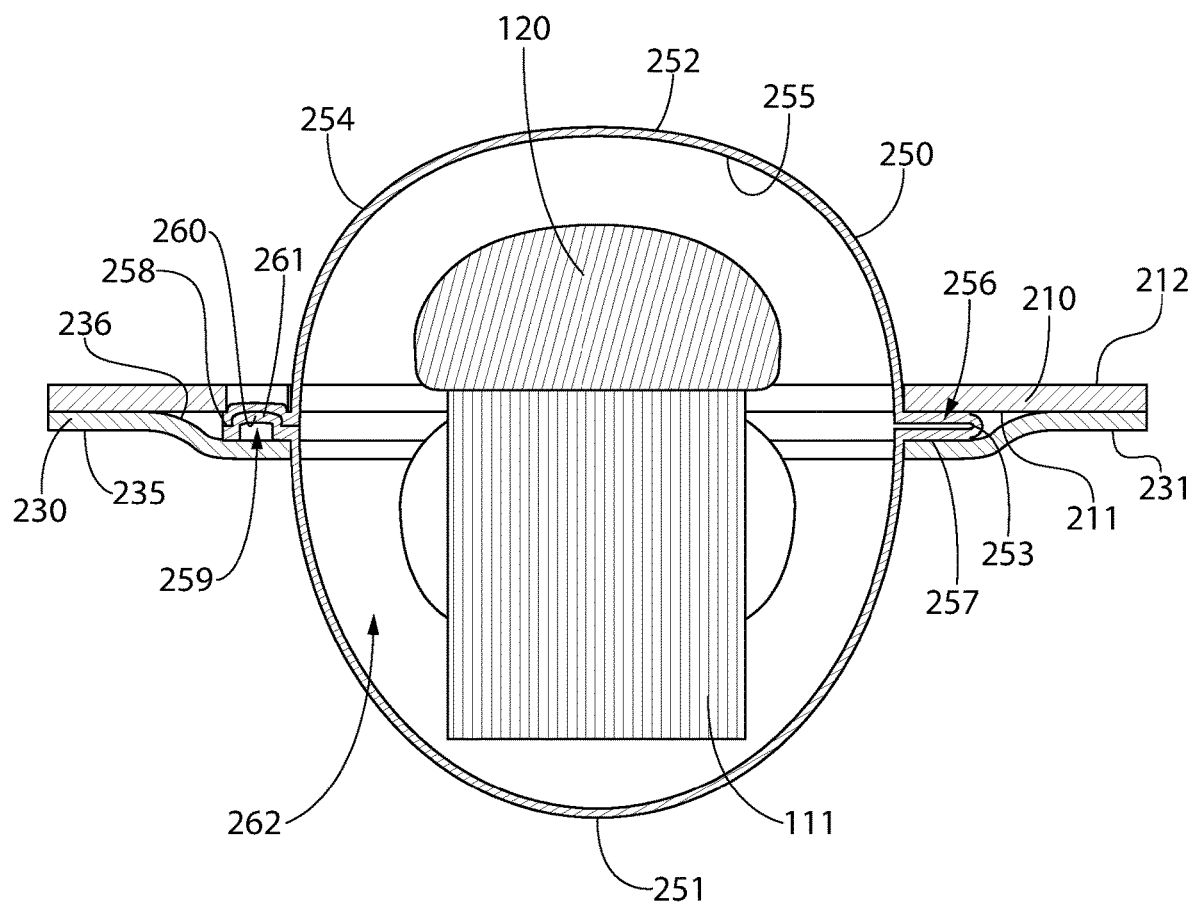
FIG. 4 is a cross-sectional view taken along line IV-IV of FIG. 3.

In the closed state, the inner surface 255 of the cap 250 defines a cavity 262. The cavity 262 is sized, shaped, and configured to retain the head 120 and the tooth cleaning elements 111 of the personal care implement 100 therein. Thus, the cap 250 may function as a protective cap or a travel cap for the personal care implement 100 that protects the head 120 and tooth cleaning elements 111 against damage. Furthermore, the hinge 253 and the clasp mechanism 259 permit the cap 250 to be reusable such that it permits a user to repeatedly alter the cap 250 between the open and closed states. As seen in FIGS. 1, 3, and 4, in the fully assembled package 200 the outer surface 254 of the cap 250 forms a portion of an exposed exterior (i.e., the exposed outer surface 201) of the package 200.

In the exemplified embodiment, the cap 250 is formed of a transparent plastic material. Of course, the cap 250 need not be transparent in all embodiments and it can be opaque or translucent in other embodiments. Furthermore, the cap 250 may be formed of a material that is tinted with a color while still allowing some (or all) of the light to pass therethrough. In some embodiments, the cap 250 may be formed of a rigid plastic material such that it does not readily deform or compress in response to the application of pressure thereto. Specifically, such a rigid plastic material may be sufficiently rigid so that an average adult user pressing on opposite sides of the cap 250 (i.e., the first and second portions 251, 252 of the cap 250) with the thumb and forefinger with a maximum amount of force will not cause the first and/or second portions 251, 252 of the cap 250 to deflect into contact with the tooth cleaning elements 111 or the head 120 of the personal care implement 100 that is retained within the cavity 262 of the cap 250. This can be achieved by selecting a suitable material or material thickness. Alternatively, the cap 250 may be formed of a flexible plastic material such that it does deform and/or compress in response to the application of pressure thereto. An embodiment of the cap 250 being deformable, including suitable materials for such a cap 250, will be described in more detail below with specific reference to FIGS. 7A and 7B.

Referring to FIG. 4, the relationship and cooperation between the backer panel 210, the cover panel 230, and the cap 250 of the package 200 will be described in accordance with an embodiment of the present invention. The cap 250 is at least partially disposed within the opening 213 of the backer panel 210 so that the first portion 251 of the cap 250 protrudes from the front surface 211 of the backer panel 210 and the second portion 252 of the cap 250 protrudes from the rear surface 212 of the backer panel 210. Thus, the cap 250 extends through the opening 213 of the backer panel 210. Furthermore, the first portion 251 of the cap 250 also extends through the opening 239 in the cover panel 230 and protrudes beyond the front surface 235 of the cover panel 230.

In the exemplified embodiment, with the cap 250 positioned within the opening 213 of the backer panel 210, the flange 256 of the cap 250 rests atop the front surface 211 of the backer panel 210. Of course, in other embodiments the flange 256 of the cap 250 could be positioned to rest atop the rear surface 212 of the backer panel 210 if so desired. Once the cap 250 is positioned in this manner, the cover panel 230 is coupled to the backer panel 210 as described previously. When the cover panel 230 is secured to the backer panel 210, the flange 256 of the cap 250 becomes sandwiched between the rear surface 236 of the cover panel 230 and the front surface 211 of the backer panel 210. Thus, the hinge 253 and the clasp mechanism 259 become trapped between the cover panel 230 and the backer panel 210, thereby securing the cap 250 as a part of the package 200 and maintaining the cap 250 in the closed state.

Figure 5:
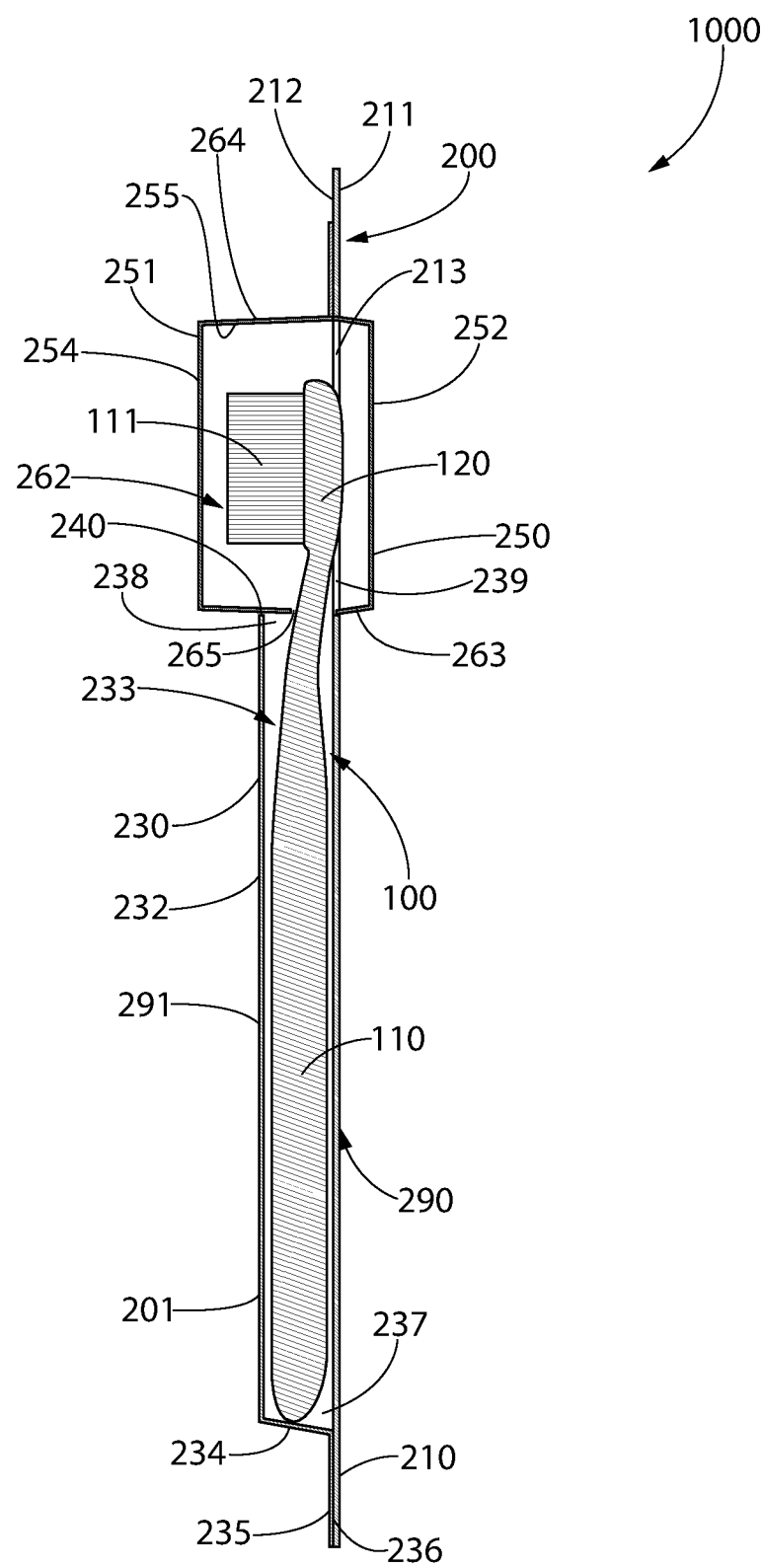
FIG. 5 is a cross-sectional view taken along line V-V of FIG. 3.

Because the cover panel 230 is fixedly coupled to the backer panel 210 using the techniques described above (heat sealing, adhesive, mechanical fasteners, etc.), sandwiching the flange 256 of the cap 250 between the cover panel 230 and the backer panel 210 ensures that the cap 250 cannot be readily separated from the backer panel 210 and the cover panel 230 and ensures that the cap 250 cannot be readily opened to expose the head 120 and tooth cleaning elements 111. As best illustrated in FIG. 5, the personal care implement 100 is positioned in the package so that the handle 110 is located within the receiving cavity 233 of the cover panel 230 (i.e., in the space between the three-dimensional contoured portion 232 of the cover panel 230 and the backer panel 210) and the head 120 of the personal care implement 100 is located within the cavity 262 of the cap 250.

Referring to FIGS. 6A-6C in succession, the manner in which the personal care implement 100 can be removed from the package 200 for use is illustrated and will be described. With reference to FIG. 6A, the first step in opening the package is removing the cover panel 230 from the backer panel 210. When the cover panel 230 is separated from the backer panel 210, the handle 110 of the personal care implement 100 becomes exposed while the head 120 of the personal care implement 100 remains enclosed within the cavity 262 of the cap 250. Furthermore, the cap 250 remains secured within the opening 213 of the backer panel 210.

Next, referring to FIG. 6B, the cap 250 is pulled out of the opening 213 in the backer panel 210 so that the cap 250 is separated from the backer panel 210. In this position, the head 120 of the personal care implement 100 still remains located and fully enclosed (within the cavity 262 of the cap 250 (i.e., circumferentially surrounded by the cap 250). Thus, in FIG. 6B the personal care implement 100 is enclosed within the cap 250, which is in the closed state. The cap 250 can be transitioned from the closed state to the open state as discussed herein above by rotating the first and second portions 251, 252 of the cap 250 about the hinge 253 or otherwise separating the first and second portions 251, 252 of the cap 250.

Finally, FIG. 6C illustrates the personal care implement 100 with the cap 250 thereon in the open state. The first coupling mechanism 260 (recess) and the second coupling mechanism 261 (protuberance) are readily visible in this view and it can be seen how they might interact to secure the cap 250 in the closed state. In embodiments that don't use a hinge, both of the first and second portions 257, 258 of the flange 256 may have mechanically cooperating features, such as a recess and a protuberance, that enable the first and second portions 251, 252 of the cap 250 to be coupled together into the closed state. FIG. 6C illustrates the manner in which the cap 250 can be repeatedly altered between the open and closed states by engaging and disengaging the clasp mechanism 259 as needed/desired. Thus, the cap 250 forms a portion of the exposed outer surface 201 of the package 200 and also functions as a reusable travel cap that fully encloses the head 120 and tooth cleaning elements 111 to protect them against damage during travel and otherwise.

Figure 7A:
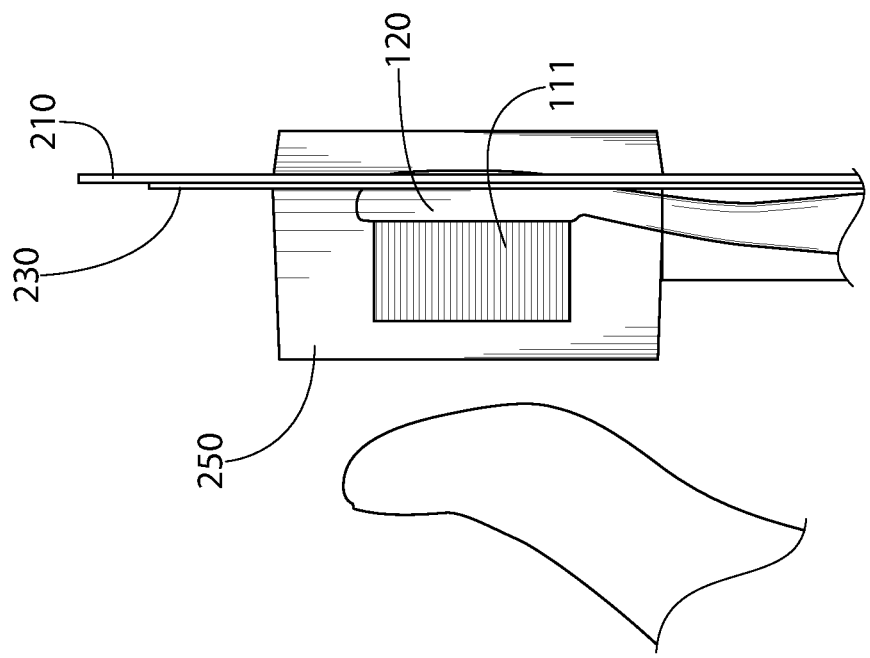
FIG. 7A is a schematic view of a portion of the packaged oral care implement of FIG. 1 illustrating compression of the cap upon application of pressure thereto.
Figure 7B:
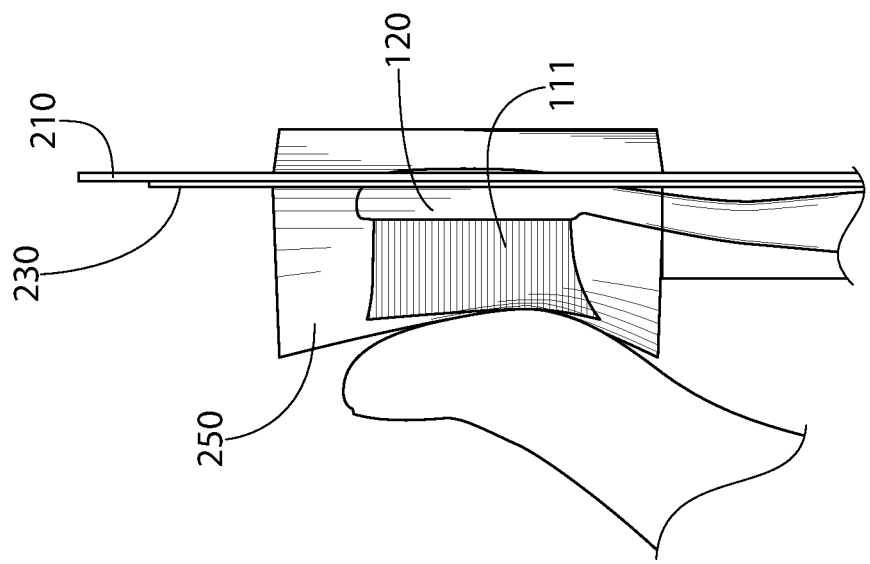
FIG. 7B is a schematic view of the portion of the packaged oral care implement of FIG. 7A illustrating decompression of the cap upon cessation of pressure thereto.

FIGS. 7A and 7B show an embodiment of the cap 250 that is formed of a flexible material as described above. Specifically, in one such embodiment the cap 250 is sufficiently flexible and resilient to enable the first and/or second portions 251, 252 of the cap 250 to be compressed or deformed upon application of pressure thereto. This enables a user to press on the cap 250 to assess characteristics of the tooth cleaning elements 111, such as bristle stiffness or the like, via manual palpation and deflection of the first and second portions 251, 252 without direct contact and without permanent deformation of the display package cap 250. Thus, the cap 250 may be formed of a flexible material such that the first and second portions 251, 252 of the cap 250 compress upon application of pressure or force thereto and decompress upon cessation of the pressure.

Specifically, in one embodiment the cap 250 may be made from a material which is sufficiently soft, sufficiently flexible, and sufficiently resilient to permit the first and second portions 251, 252 to be manually deflected. Any suitable material and/or construction (i.e., material thickness or the like) having sufficiently soft, flexible, and resilient characteristics can be used for construction of the cap 250. In one embodiment, the material used for construction of the cap 250 is thermoplastic polyurethane (TPU). Certain other materials may also be suitable, including, e.g., silicone, synthetic and natural rubbers, elastomers, and monolayer or multilayer films including one or more layers of materials such as polyvinyl alcohol, polymethylmethactylate, polyamide, polycarbonate, polyethylene, polypropylene, polyvinyl chloride, polystyrene, or combinations thereof.

It is preferred that the materials not have any tendency to crinkle or crease when subjected to deflection by consumers. The cap 250 may in some embodiments be sufficiently flexible to allow bending and conformation of the first and second portions 251, 252 to a user's thumb or fingers and to allow bending and manipulation of the tooth cleaning elements 111 when felt through the cap 250. The cap 250 should be sufficiently resilient to withstand multiple deflections of varying magnitudes to deflect the first and/or second portions 251, 252 of the cap 250 into contact with portions of the personal care implement 100, and to consistently and reliably revert to its original configuration. The cap 250 preferably has a least a portion made of a first material that is softer, more flexible, and/or more resilient than a second material that is used for other portions of the package such as the cover panel 230. The cap 250 can be flexible as illustrated in FIGS. 7A and 7B and described above while still functioning as a reusable travel cap as described above.

Finally, in an alternative embodiment the first portion 251 of the cap 250 may be formed of a first material and the second portion 252 of the cap 250 may be formed of a second material, the first material being more flexible than the second material or the second material being more flexible than the first material. Thus, for example, the first material may be one of the flexible materials that is compressible/deformable as described above and the second material may be a rigid material that is not compressible/deformable as described above.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A packaged personal care implement comprising:
   a package comprising:
      an exposed outer surface;
      a package portion having an inner surface defining a first cavity having a first opening, the package portion having an outer surface that defines a first portion of the exposed outer surface, the package portion further comprising:
         a backer panel having a front surface and a rear surface; and
         a cover panel having a front surface, a rear surface, and a contoured portion, the cover panel coupled to the backer panel so that the first cavity is formed by the contoured portion of the cover panel and the front surface of the backer panel; and
      a reusable cap comprising an outer surface that forms a second portion of the exposed outer surface and an inner surface that defines a second cavity having a second opening, wherein the reusable cap comprises a first portion and a second portion that are repeatedly alterable between an open state and a closed state, the reusable cap further comprising a flange extending from the outer surface of the reusable cap, wherein the flange of the reusable cap is sandwiched between the rear surface of the cover panel and the front surface of the backer panel; and
   a personal care implement disposed within the package so that the personal care implement extends through the first and second openings such that a first portion of the personal care implement is located within the first cavity and a second portion of the personal care implement is located within the second cavity;
   wherein the backer panel, cover panel and cap cooperate to fully enclose the personal care implement within the package.

2. The packaged personal care implement according to claim 1 wherein the cap extends along a longitudinal axis, and wherein the flange comprises a first portion and a second portion that are circumferentially spaced apart from one another, the first portion of the flange forming a hinge for the reusable cap and the second portion of the flange forming a clasp mechanism that temporarily secures the reusable cap in the closed state.

3. The packaged personal care implement according to claim 1 further comprising an opening in the backer panel, and wherein the reusable cap is disposed within the opening in the backer panel so that the first portion of the cap protrudes from the front surface of the backer panel and the second portion of the cap protrudes from the rear surface of the backer panel.

4. The packaged personal care implement according to claim 1 wherein the reusable cap is formed of a flexible material such that the reusable cap compresses upon application of pressure thereto and decompresses upon cessation of the pressure.

5. The packaged personal care implement according to claim 1 wherein the reusable cap is formed of a rigid material that cannot be readily compressed.

6. The packaged personal care implement according, to claim 1 wherein the personal care implement is a toothbrush and wherein the first portion of the personal care implement is a handle of the toothbrush and the second portion of the personal care implement is a head of the toothbrush.

7. The packaged personal care implement according, to claim 1 wherein the personal care implement extends along a longitudinal axis, wherein the first portion of the personal care implement is circumferentially surrounded by the package portion and the second portion of the personal care implement is circumferentially surrounded by the reusable cap such that no portion of the personal care implement is exposed at the outer surface of the package.

8. The packaged personal care implement according to claim 1 wherein the second portion of the personal care implement extends along an axis and the reusable cap circumferentially surrounds the second portion of the personal care implement.

9. A packaged personal care implement comprising:
a package comprising:
  a backer panel having a front surface;
  a cap comprising an outer surface having a flange extending therefrom and an inner surface that defines a cavity; and
  a cover panel having a rear surface, the cover panel coupled to the backer panel so that the flange of the cap is sandwiched between the rear surface of the cover panel and the front surface of the backer panel; and
a personal care implement disposed within the package so that a first portion of the personal care implement rests atop the front surface of the backer panel and a second portion of the personal care implement is located within the cavity of the cap.

10. The packaged personal care implement according to claim 9 wherein the cap is reusable and repeatedly alterable between an open state and a closed state.

11. The packaged personal care implement according to claim 9 wherein the cap has a longitudinal axis, and wherein the flange comprises a first portion and a second portion that are circumferentially spaced apart from one another, the first portion of the flange forming a living hinge for the cap and the second portion of the flange forming a clasp mechanism that temporarily secures the cap in the closed state.

12. The packaged personal care implement according to claim 9 wherein the cover panel comprises a receiving cavity having an open rear end that is closed by the backer panel, and wherein the first portion of the personal care implement is located within the receiving cavity of the cover panel.

* * * * *